Patented May 9, 1944

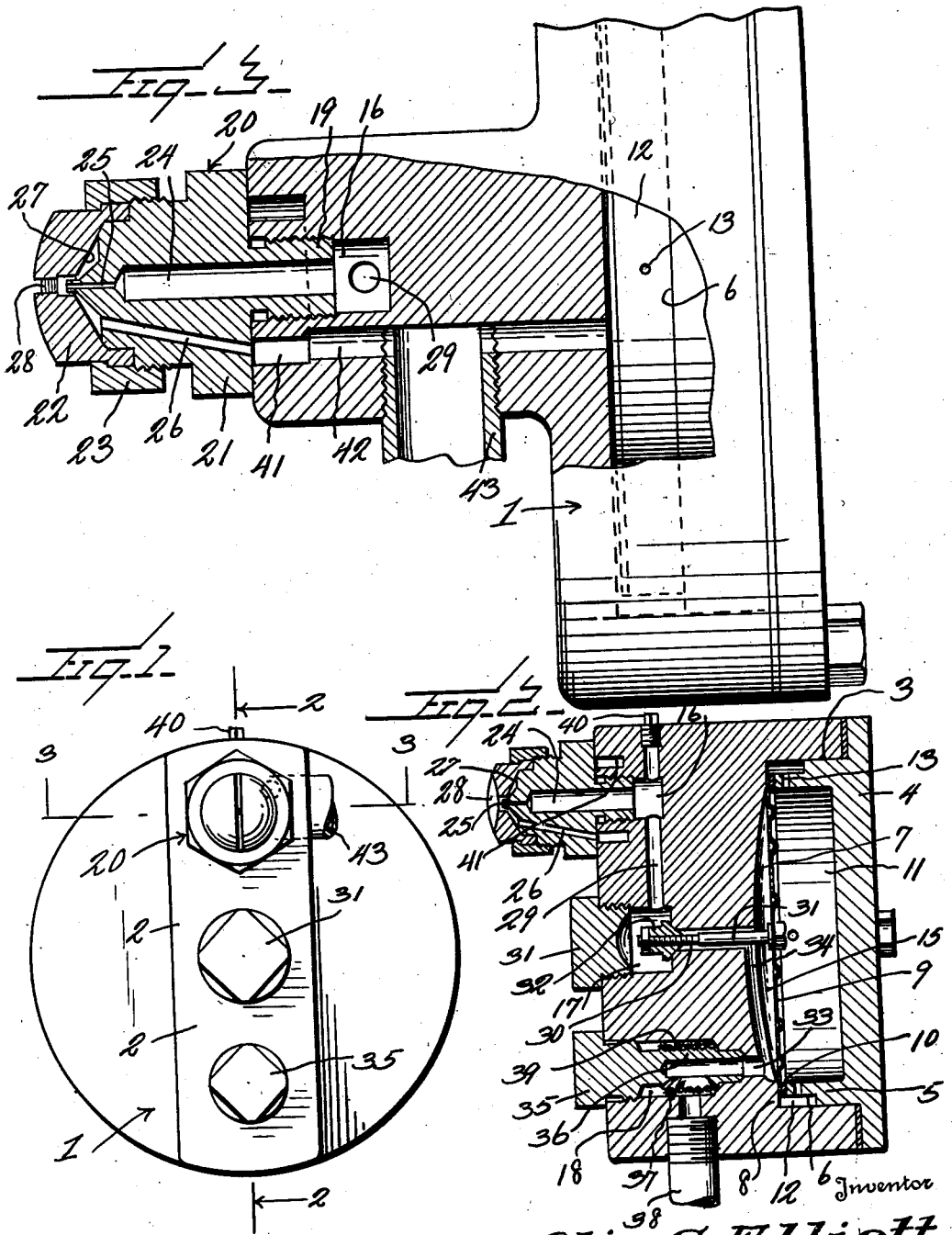

2,348,248

UNITED STATES PATENT OFFICE 2,348,248

AUTOMATIC VALVE FOR PRESSURE TYPE ATOMIZERS

Olin S. Elliott, Greenville, S. C.

Application August 14, 1941, Serial No. 406,896

3 Claims. (Cl. 137—153)

This invention relates generally to fluid mixing devices and pertains particularly to an improved and simplified automatic fluid valve for pressure type atomizers.

The principal object of the present invention is to provide an automatic fluid valve wherein fluid and air under pressure are employed in opposing relation to effect the opening of the valve, when the air pressure is sufficiently high to effect proper atomization of the liquid under the action of the air as the two issue from a pressure type atomizing nozzle.

Another object of the invention is to provide an atomizer valve wherein the opening and closing of the valve is entirely controlled by the opposing pressures of the liquid and air or other gas, and the employment of springs or other mechanical devices for effecting the movement of the valve is avoided.

Still another object is to provide an atomizer valve structure which is so designed that it may be easily and economically produced, readily taken apart and reassembled when necessary for cleaning or replacement of parts, strong and durable, employing a minimum of working parts to wear and get out of order, and efficient in operation.

The invention will be best understood from a consideration of the following description taken in connection with the accompanying drawing, it being understood, however, that the invention is not to be considered as limited by the specific illustration or description but that such illustration and description constitutes a preferred embodiment of the invention.

In the drawing:

Figure 1 is a view in front elevation of a valve constructed in accordance with the present invention;

Figure 2 is a sectional view taken on the line 2—2, of Figure 1;

Figure 3 is a partial sectional view, and partial elevation, the sectioned portion being taken on the line 3—3 of Figure 1.

Referring now more particularly to the drawing the numeral 1 generally designates a circular body upon one side face of which is formed the diametrically extending, relatively thick head in the form of a rib 2.

In the side of the body 1 opposite from the head 2 there is formed a circular chamber or recess 3 and this recess is closed by the plate 4 which is bolted or otherwise suitably secured to the body 1, as illustrated.

The inner face of the closure plate 4 is provided with the annular rib 5 which, adjacent its inner edge, is provided in its outer side with the encircling recess 6. The bottom of the chamber 3 is depressed or concaved, as indicated at 7, for the purpose hereinafter described. As shown, this depression does not extend the full diameter of the bottom of the chamber so that there is thus provided around the depression a shoulder 8 and upon this shoulder rests the peripheral portion of a ribbed or corrugated diaphragm 9.

The annular flange 5 of the closure plate 4 clamps the peripheral portion of the diaphragm firmly against the shoulder 8, a gasket or other suitable leak preventing means 10 being interposed between the flange and the edge of the diaphragm as shown. There is thus provided upon the outer side of the diaphragm the relatively large air or other gas receiving chamber 11 and by reason of the formation of the channel 6 around the outer side of the flange 5 there is also provided the annular air chamber 12 which is in communication with the larger chamber 11 through the passages 13 which are formed through the flange 5, as is clearly shown in Figure 2.

Upon the opposite or inner side of the diaphragm 9 there is formed, between the diaphragm and the depressed bottom 7, a liquid receiving chamber 15.

In the face of the head 2 there are formed the three bores, indicated by the numerals 16, 17 and 18, each of which is screw-threaded adjacent its outer end as shown.

The bore 16 receives the threaded stem portion 19 of a nozzle unit 20, which unit comprises a main body portion 21 with which the stem 19 is integrally connected, and a cap 22 which is threaded upon the main body portion and secured in position by the lock nut 23. This body portion 21 of the nozzle is provided with the axial passage or bore 24 which leads through the stem 19 at one end and at its opposite end communicates with the restricted outlet 25, as shown in Figure 3. There is also formed through this body 21 the oblique passage 26 which opens at its inner end through the bottom of the body at one side of the stem 19 and at its outer end it opens through the end of the body at one side of the reduced bore or passage 25. Both of these passages 25 and 26 open into the hollow inner portion 27 of the cap.

In the operation of the device the liquid passes through the passage 24 of the nozzle and discharges into the outlet opening 28 of the cap through the constricted passage 25 and the air or other gas passes through the passage 26 into the chamber 27 and mixes with the liquid so that the liquid emerges in a fine spray.

The inner end of the bore 16 is connected with the central or intermediate bore 17 by the liquid passage 29 and the inner end of the bore 17 is connected with the chamber 15 at the inner or back side of the diaphragm by the passage 30. The outer end of the bore 17 is closed by the removable plug 31 and thus access may be readily had to the bore 17 for cleaning the same or for removing or inserting the hereinafter described valve body.

Connected with the center of the diaphragm 9 is one end of a rigid valve stem 31, upon the other end of which is mounted a tapered valve element 32 which normally engages in and closes the adjacent end of the passage 30, as illustrated in Figure 2.

The bore 18 is connected at its inner end, by means of the passage 33, with the liquid chamber 15 and the bottom wall of this chamber has formed therein from the end of the passage 33, to the passage 30, the channel 34 through which or along which liquid may flow even though the diaphragm may be forced entirely inwardly against the concaved bottom 7.

The outer end of the passage 18 is closed by the removable plug 35 and this plug is provided with a tubular extension 36, the inner end of which connects with the passage 33 while adjacent the opposite end the wall of the passage is provided with the lateral opening 37 through which liquid may flow from the supply pipe 38 to enter the chamber 15.

A screen 39 of suitable form is placed around the tubular extension 36 so as to remove from the inflowing liquid any particles which might interfere with the proper operation of the valve 32 or clog the outlet tip of the nozzle 20.

As shown in Figure 2, the passage 29 is continued through the top of the head 2 where it is closed by the removable plug 40. This provides a convenient means for cleaning this particular passage.

In the body of the head 2 there is formed around the bore 16, the annular channel 41 into which the inner end of the passage 26 of the nozzle opens and leading from the bottom of this channel through the head in a direction paralleling the axis of the circular body 1 is the air passage 42 which communicates with the chamber 3, opening into the annular chamber 12 which is formed at the inner end of the flange 5.

Air or other gas under pressure is introduced into the passage 42 by way of the pipe 43.

In the operation of the present atomizer valve air is supplied to the chambers 11, 12 and 41, through the pipe 43 and liquid, such as water or the like, is introduced through the pipe 38 into the chamber 15 at the back of the diaphragm. The pressure of the air is slightly greater than that of the water. The air passes from the channel 41 through the passage 26 to the outlet of the cap 22 for the nozzle and it also passes through the passage 42 into the annular chamber 12 and from there into the chamber 11 through the passages or apertures 13 so as to create in the chamber 11 a pressure against the diaphragm tending to force or flex the same in a direction which will unseat the valve 32. During this time water or other liquid has entered the chamber 15 upon the opposite side of the diaphragm and as soon as the valve opens this liquid will pass by way of the bore 17 and passage 29 through the axial passage 24 of the nozzle to mix with the air in the outlet of the nozzle cap. This action will not, however, take place until sufficient air pressure is built up against the diaphragm to overcome the water pressure against the opposite side so as to cause the valve 32 to be unseated.

With the present atomizer valve structure it will be readily seen that no water or other liquid can be discharged at the nozzle outlet until sufficient air pressure has been built up in the chamber 11. Also it will be seen that the action of the valve is not dependent, either for opening or closing, upon springs or the like but is closed by the return of the diaphragm to its normal position and is opened by the over-balancing of one pressure by the other.

I claim:

1. A mixing valve structure comprising a body having a large circular recess formed in one side, a closure plate overlying the recess and having a circular flange extending into the recess, said recess having a bottom of dish-like form within an encircling shoulder, a diaphragm disposed over said bottom with its periphery resting upon said shoulder, said flange bearing against the diaphragm and securing the same against the shoulder, said flange upon its outer side having an encircling channel, the diaphragm dividing the recess into an inner and an outer fluid chamber, said flange having an aperture therethrough establishing communication between the outer fluid chamber and the recess formed in the opposite side of the flange, a fluid conduit leading through the body and having an inlet and an outlet, said conduit including the inner chamber, a valve stem secured at one end to the diaphragm and extending through a portion of the conduit into an enlarged space forming a part of the conduit, said enlarged space having a wall portion formed to provide a valve seat encircling the conduit and facing away from the diaphragm, a valve element carried upon the other end of the stem within said enlarged space for engagement on said seat to close the conduit when the diaphragm is unflexed, the diaphragm when unflexed and when forced past its unflexed position toward the outer chamber, acting to pull the valve to its seat, a second fluid conduit formed through the body and having an inlet end and an outlet end, the said outlet ends of the two conduits joining whereby fluids passing therethrough will be mixed, and said second-mentioned conduit being in communication with the first-mentioned recess for the introduction of fluid into the recess of said closure plate flange.

2. A mixing valve structure comprising a body having a recess formed in and opening thru one side, said recess having a depressed bottom encircled by a flat shoulder, a closure plate overlying the recess and having a flange extending into the recess in opposing relation with said shoulder, a diaphragm disposed over said bottom with its periphery resting upon said shoulder, the flange bearing against the periphery of the diaphragm and securing the latter against the shoulder, said diaphragm dividing the recess into an inner and an outer fluid chamber, a fluid conduit leading through the body and having an inlet and an outlet end, said conduit including the inner chamber, the conduit being enlarged between the outlet end thereof and said inner chamber to form a valve compartment, said compartment including a valve seat concentric with the conduit and facing away from the diaphragm, a valve stem secured to the diaphragm and extending through an adjacent portion of the conduit into said compartment, a valve element carried upon said stem for engagement with said seat, flexing of the diaphragm toward the said inner chamber causing the unseating of the valve and movement of the diaphragm to its unflexed position pulling the valve to its seat, a second fluid conduit formed through the body and having an inlet end and an outlet end, said second fluid conduit being in communication with the outer fluid chamber, and said fluid conduits being in communication upon the sides of the chambers with which they are in communication, remote from the inlet ends of the conduits.

3. A mixing valve as set forth in claim 2, in which said first conduit has a portion between the inner chamber and said inlet end divided into two sections, one section leading from the inlet end and the second section extending from the outside of the body across the said one section to the inner chamber, a removable plug secured in and closing the outer end of the second section and having a longitudinally bored portion disposed across the inner end of the said one section, said bored portion of the plug having a lateral opening communicating with the said one section, and the bored portion being in communication at one end with the inner chamber.

OLIN S. ELLIOTT.